United States Patent
Kitayama

(10) Patent No.: US 11,983,515 B1
(45) Date of Patent: May 14, 2024

(54) OPTIMIZING SOURCE CODE USING CALLABLE UNIT MATCHING

(71) Applicant: International Business Machines Corporation, Armonk, NY (US)

(72) Inventor: Fumihiko Kitayama, Sagamihara (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 23 days.

(21) Appl. No.: 17/974,344

(22) Filed: Oct. 26, 2022

(51) Int. Cl.
*G06F 8/65* (2018.01)
*G06F 8/41* (2018.01)

(52) U.S. Cl.
CPC ............... *G06F 8/423* (2013.01); *G06F 8/65* (2013.01)

(58) Field of Classification Search
None
See application file for complete search history.

(56) References Cited

U.S. PATENT DOCUMENTS

| | | | |
|---|---|---|---|
| 9,176,714 B2 | 11/2015 | Majoros | |
| 10,871,950 B2* | 12/2020 | De Smet | G06F 16/9024 |
| 11,474,817 B2* | 10/2022 | Sousa | G06F 8/36 |
| 2004/0015918 A1* | 1/2004 | Kawahito | G06F 8/4441 |
| | | | 717/154 |
| 2018/0225110 A1 | 8/2018 | Borlick et al. | |
| 2020/0142690 A1 | 5/2020 | Kennedy et al. | |
| 2020/0257511 A1* | 8/2020 | Durvasula | G06F 8/36 |
| 2020/0310768 A1* | 10/2020 | Zhang | G06F 8/43 |
| 2020/0348929 A1* | 11/2020 | Sousa | G06F 8/36 |

FOREIGN PATENT DOCUMENTS

EP 3840289 A1 * 6/2021 ............... H04L 9/32

OTHER PUBLICATIONS

Kamiya, AIST CCFinderX Older Versions, Oct. 15, 2006.
Kamiya, What's CCFinderX?, May 2, 2008.

\* cited by examiner

*Primary Examiner* — Philip Wang
(74) *Attorney, Agent, or Firm* — Garg Law Firm, PLLC; Rakesh Garg; Edward Wixted

(57) ABSTRACT

An embodiment searches source for callable units, and scans the contents of the callable units, and generates a set of unit groups that each include one or more of the callable units. The embodiment preprocesses the callable units and then generates hashes of each of the callable units. The embodiment generates a data structure comprising unit identifiers associated with the hashes and their corresponding callable units. The embodiment generates statistical data using a callable-unit metric and updates the data structure by prioritizing the callable units based on the statistical data. The embodiment compares hashes of the callable units and identifies first and second callable units as redundant callable units. The embodiment updates the data structure by identifying the second callable unit as being redundant to the first callable unit. The embodiment generates a report of redundant callable units based on the data structure.

20 Claims, 14 Drawing Sheets

OPTIMIZING SOURCE CODE USING CALLABLE UNIT MATCHING

BACKGROUND

The present invention relates generally to source code optimization. More particularly, the present invention relates to a method, system, and computer program for optimizing source code using callable unit matching.

Many businesses have legacy software that has been in place and relied upon for many years. Often, when a particular program is considered vital to maintaining some aspect of a business, there is a reluctance to transition to new software as the legacy software ages and the technologies involved with the legacy software becomes obscure or obsolete. However, because transitioning to a newer program may involve considerable overhead and downtime for such things as retraining, reformatting data, evaluating related systems and processes that may be affected by the change, and so on. Therefore, in some cases, rather than transition to new software, it may be a better option to modernize the existing program.

Modernization is the practice of updating legacy software to take advantage of newer technologies while maintaining the same functionality. Modernization often involves rewriting source code in a more modern programming language, updating libraries, adding support for newer hardware platforms and protocols, and various other updates depending on the age and type of software involved.

There are many reasons for opting to modernize rather than replace a legacy system. Modernization allows older programs to be updated to take advantage of newer technologies with little or no retraining being necessary and with minimal impact on company processes and related systems. In addition, legacy software can typically be updated incrementally rather than all at once, which may help mitigate risk and spread out the expense over an extended period of time compared to implementing a new replacement system all at once.

SUMMARY

The illustrative embodiments provide for optimizing source code using callable unit matching. An embodiment includes executing a querying process that searches source code of a program for callable units within the source code of the program. The embodiment also includes scanning contents of callable units in a set of callable units returned by the querying process. The embodiment also includes generating unit group data indicative of a set of unit groups, where the set of unit groups comprises groups of one or more callable units of the set of callable units. The embodiment also includes preprocessing callable units in the set of unit groups, where the preprocessing comprises revising the callable units based on a preprocessing rule. The embodiment also includes generating hashes of each of the callable units in the set of unit groups, where the callable units in the set of unit groups comprise a first callable unit and a second callable unit, and where the hashes comprise a first hash of the first callable unit and a second hash of the second callable unit. The embodiment also includes generating a data structure comprising unit identifiers associated with respective hashes and corresponding callable units in the set of unit groups. The embodiment also includes generating statistical data associated with a callable-unit metric for each callable unit in the set of unit groups. The embodiment also includes updating the data structure by associating priority values with respective callable units, where the priority values prioritize the callable units based on the statistical data. The embodiment also includes comparing hashes of the callable units in the set of unit groups, the comparing comprising identifying pairs of redundancy candidates from among the callable units in the unit groups, where the comparing comprises detecting that the first hash matches the second hash. The embodiment also includes updating the data structure by identifying the second callable unit as being redundant to the first callable unit. The embodiment also includes generating a report of redundant callable units based on the data structure. Other embodiments of this aspect include corresponding computer systems, apparatus, and computer programs recorded on one or more computer storage devices, each configured to perform the actions of the embodiment.

An embodiment includes a computer usable program product. The computer usable program product includes a computer-readable storage medium, and program instructions stored on the storage medium.

An embodiment includes a computer system. The computer system includes a processor, a computer-readable memory, and a computer-readable storage medium, and program instructions stored on the storage medium for execution by the processor via the memory.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of the illustrative embodiments when read in conjunction with the accompanying drawings, wherein:

DETAILED DESCRIPTION

Figure 1:
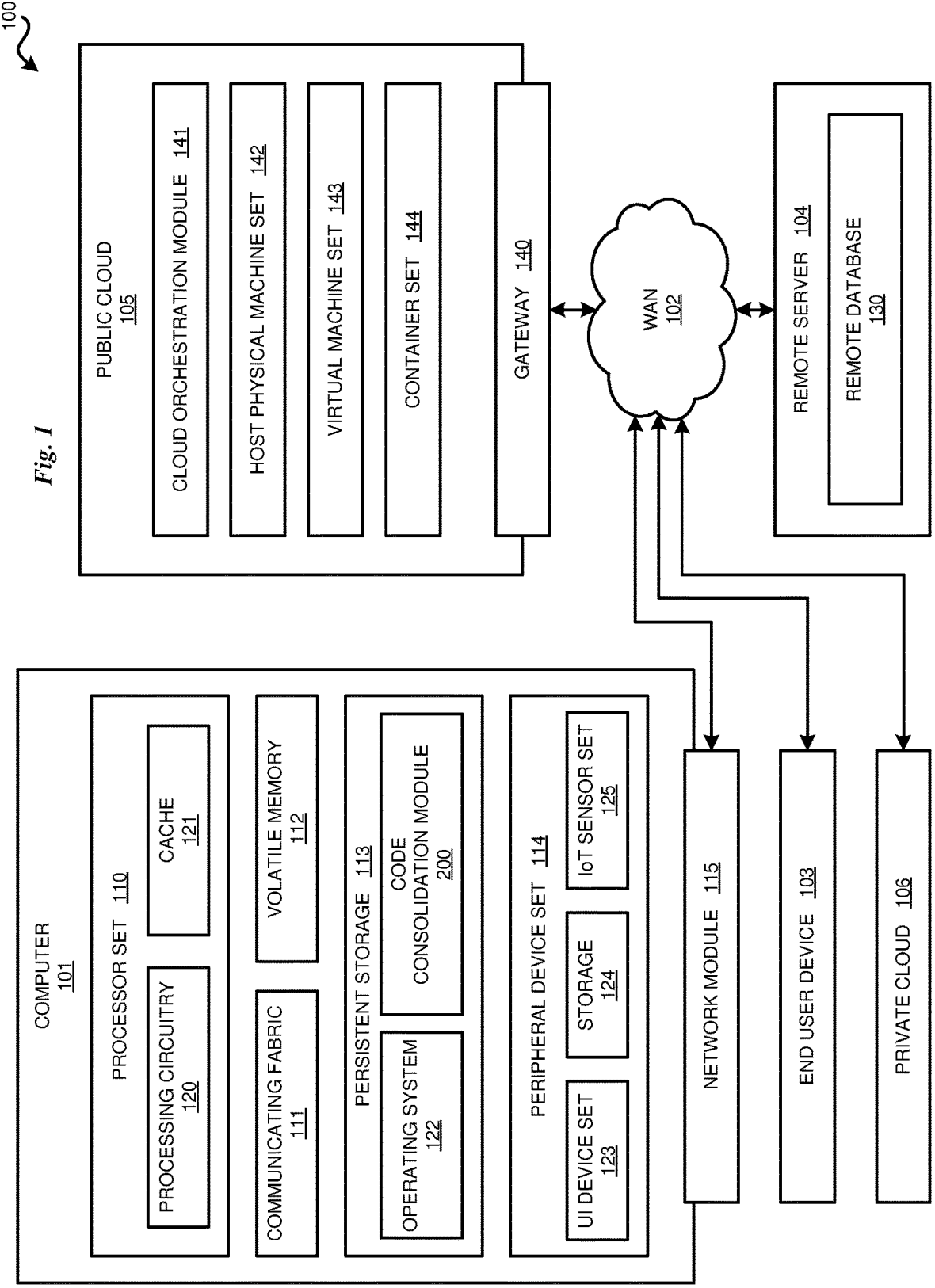
FIG. 1 depicts a block diagram of a computing environment in accordance with an illustrative embodiment.

Modernization from legacy technology to new technology often requires significant manual intervention. Manual work is error-prone due to the size of large legacy software that cannot be fully managed by a human mind (complexity, volume of algorithms and information). Hundreds and even thousands of man-days are required to modernize average legacy software. Thus, there is considerable incentive to reduce the amount of source code involved in the modernization process where possible.

The present disclosure recognizes that source code, particularly for large, legacy programs, often includes duplicative source code. The present disclosure further recognizes that duplicative code is often generated when copying during initial and/or maintenance development and may be generated by using an automated code generation tool. In these scenarios, the present disclosure is based on a realization that the duplicative code is often present in the form of duplicative callable units.

Herein, a "program" may be considered to be an entire/complete system of software (source code/instructions); however, the "program" may be a sub-system or component of a larger system of software. In general, a program comprises a plurality of "callable units" and is arranged to receive input for the program to process. Each "callable unit" may be, for example, a respective one of: a routine; a subroutine; a function; a procedure; a process; a class method; an interface; a component; a section or paragraph (in COBOL (COmmon Business Oriented Language)), an internal PROC (in PL/I (Programming Language One)), or a subsystem of a larger system; etc. References herein to specific types of callable unit (e.g., references to a "function" or a "component") should be taken to include references to other types of callable unit.

Exemplary embodiments disclosed herein provide for consolidated processing of received program source code. In the illustrated embodiment, the process receives program source code for consolidation processing. For example, in some embodiments, the process receives source code for legacy software in preparation for modernizing the legacy software. The process identifies callable units that are functionally equivalent. This allows unnecessarily redundant source code to be removed, thereby reducing the amount of source code for the modernization process and improving the overall maintainability of the program.

In an exemplary embodiment, the process executes a querying process that searches the source code in order to detect and identify all of the callable units. The process then scans the contents of each of the callable units. The scanning process allows the process to gather some information about each callable unit that can be used to determine if the callable unit is inherently unique or potentially duplicative.

In some embodiments, the process generates unit group data indicative of a set of unit groups. Each unit group includes one or more of the callable units in the received source code. In some embodiments, the unit groups correspond with callable units that remain candidates for consolidation processing i.e., they are potentially duplicative of other callable units. In some embodiments, the scanning process detects calls to other callable units. If such a call exists, the callable unit containing the call to another callable unit is considered to be inherently unique because the call to another callable unit is treated as a unique call destination, and that callable unit is removed from consideration as a potentially redundant source code.

In some embodiments, the process also detects non-local exit instructions that terminate a program during the callable unit and for instructions that control movement to another callable unit (so-called GOTO statement) while scanning the callable units. In some embodiments, such callable units are removed from consideration as a potentially redundant source code because such termination and movement control instructions complicate the reuse of the source code. In some embodiments, the callable units are kept as unit groups and thus remain consolidation candidates. In such embodiments, information regarding the termination and movement control instructions are recorded with the callable units, in case they can be matched or adequately handled later in the process.

In some embodiments, the process preprocesses the callable units in the set of unit groups. In some embodiments, the process performs hash-based matching. In some such embodiments, the preprocessing prepares the callable units for the hash-based matching by standardizing the callable units to the extent reasonably possible.

For example, in some embodiments, the preprocessing of the callable units may be based on one or more preprocessing rules associated with standardizing the callable units. In some embodiments, the preprocessing includes eliminating spaces, newlines, comments and replacing internal variable names and internal procedural names with standardized characters. In some embodiments, the preprocessing of the callable units may be based on one or more preprocessing rules associated with the consolidation processing. In some embodiments, preprocessing may include modifying an instruction of a callable unit by at least one of casting a data type of the instruction to a different data type, removing trailing characters, removing leading characters, and replacing one or more characters in the instruction with replacement characters. For example, preprocessing may include removing and/or replacing one or more delimiters in one or more instructions.

In some embodiments, the scanning process identifies preliminary matches among the callable units. In some such embodiments, the preprocessing rule comprises changing at least one of the first and second callable units such that the first and second callable units have a same name. Also, in some such embodiments, the preprocessing rule comprises changing at least one of the first and second callable units such that a local variable in both of the first and second callable units has a same name.

Once the process has completed preprocessing, the unit groups with the callable units that remain candidates for consolidation processing are processed. In some embodiments, the process performs hash-based comparison to detect matching pairs of callable units. Thus, in some embodiments, the process generates hashes of each of the callable units. In some such embodiments, the process then generates a data structure comprising unit identifiers associated with respective hashes and corresponding callable units in the set of unit groups. In some embodiments, the process compares the hashes of the callable units in order to identify pairs of callable units having matching hashes. In some embodiments, the data structure is updated to identify the callable units having matching hashes for later confirmation of duplicative code.

In some embodiments, the process generates statistical data associated with a callable-unit metric for each callable unit in the set of unit groups. For example, in some embodiments, the process determines number of processor instructions, number of lines, and/or number of lines without comment based on such metrics. In some embodiments, this statistical data is then used as a basis for arranging and prioritizing the callable units. For example, in some embodiments the callable units having more processor instructions are assigned a higher priority than callable units having fewer processor instructions. Also, in some embodiments, the process discards callable units having fewer than a threshold number of processor instructions. In such embodiments, callable units having less than a threshold number of instructions are removed in order to prevent a combinatorial explosion.

In some such embodiments, the process then generates a report of redundant callable units based on matched-hash information in the data structure. In some embodiments, the report may be a physical report or an electronic report. In some embodiments, the report lists callable units having matching hashes to allow a user to confirm that the pair of matching callable units are duplicative.

In some embodiments, the process generates a signal configured to cause a program update process to recognize the second callable unit as redundant to the first callable unit. In some embodiments, the process provides the signal to a code updating module or the like. For example, in an embodiment in which first and second callable units are identified as matching callable units, the signal from process instructs the code updating module to update the first callable unit, eliminate the second callable unit, and update calls to the second callable unit with calls to the updated first callable unit. Thus, in some embodiments, the causes generation of a revised program in which duplicative code has been reduced by removing the second callable unit and using the first callable unit for calls to the second callable unit.

For the sake of clarity of the description, and without implying any limitation thereto, the illustrative embodiments are described using some example configurations. From this disclosure, those of ordinary skill in the art will be able to conceive many alterations, adaptations, and modifications of a described configuration for achieving a described purpose, and the same are contemplated within the scope of the illustrative embodiments.

Furthermore, simplified diagrams of the data processing environments are used in the figures and the illustrative embodiments. In an actual computing environment, additional structures or components that are not shown or described herein, or structures or components different from those shown but for a similar function as described herein may be present without departing the scope of the illustrative embodiments.

Furthermore, the illustrative embodiments are described with respect to specific actual or hypothetical components only as examples. Any specific manifestations of these and other similar artifacts are not intended to be limiting to the invention. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, computer readable storage media, high-level features, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation, or garbage collection, but this does not render the storage device as transitory because the data is not transitory while it is stored.

With reference to FIG. 1, this figure depicts a block diagram of a computing environment 100. Computing environment 100 contains an example of an environment for the execution of at least some of the computer code involved in performing the inventive methods, such as an improved code consolidation module 200 that optimizes source code using callable unit matching. In addition to code consolidation module 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and code consolidation module 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in code consolidation module 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel. The code included in code consolidation module 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Measured service: cloud systems automatically control and optimize resource use by leveraging a metering capability at some level of abstraction appropriate to the type of service (e.g., storage, processing, bandwidth, and active user accounts). Resource usage can be monitored, controlled, reported, and invoiced, providing transparency for both the provider and consumer of the utilized service.

Figure 2:
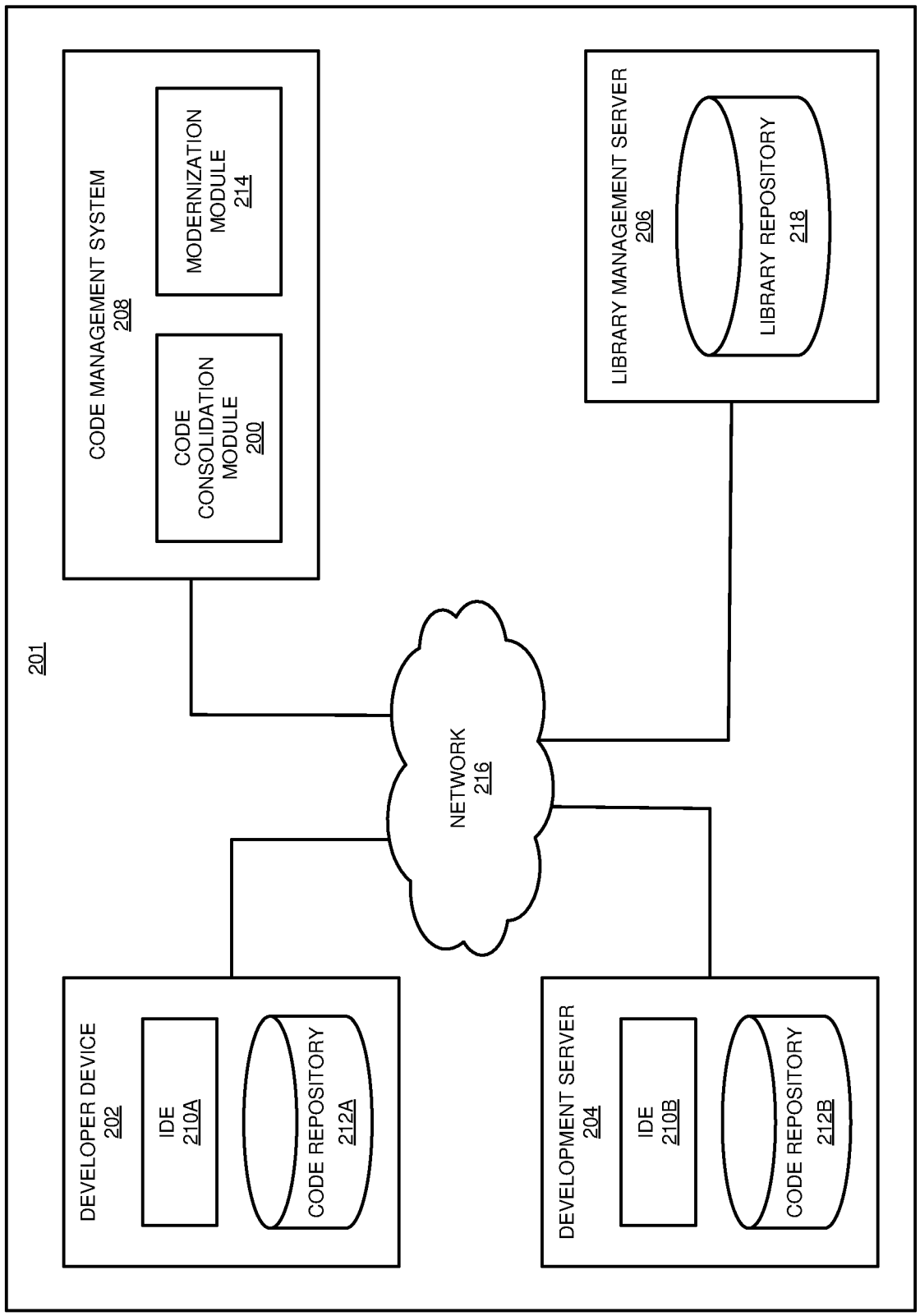
FIG. 2 depicts a block diagram of an exemplary networked computer environment that includes a code management system having a code consolidation module in accordance with an illustrative embodiment.

With reference to FIG. 2, this figure depicts a block diagram of an exemplary networked computer environment 201 that includes a code management system 208 having a code consolidation module 200 in accordance with an illustrative embodiment.

In the illustrated embodiment, the networked computer environment 201 includes developer device 202, development server 204, library management server 206, and code management system 208 interconnected via a communication network 216. In some embodiments, the developer device 202 and/or the development server 204 include an integrated development environment (IDE) 210A, 210B and a code repository 212A, 212B. In some embodiments, the library management server 206 includes a library repository 218. In some embodiments, the code management system 208 comprises the code consolidation module 200 and a modernization module 214. In alternative embodiments, the networked computer environment 201 can include some or all of the functionality described herein but grouped differently into one or more modules. In some embodiments, the functionality described herein is distributed among a plurality of systems, which can include combinations of software and/or hardware-based systems, for example Application-Specific Integrated Circuits (ASICs), computer programs, or smart phone applications. It will be appreciated that the view of the developer device 202, development server 204, library management server 206, and code management system 208 in FIG. 2 is a simplified block diagram not intended to show every aspect of the developer device 202, development server 204, library management server 206, and code management system 208; rather, in actual implementations the developer device 202, development server 204, library management server 206, and code management system 208 will have many additional components not shown, such as a processor, display, system bus, etc.

Figure 3:
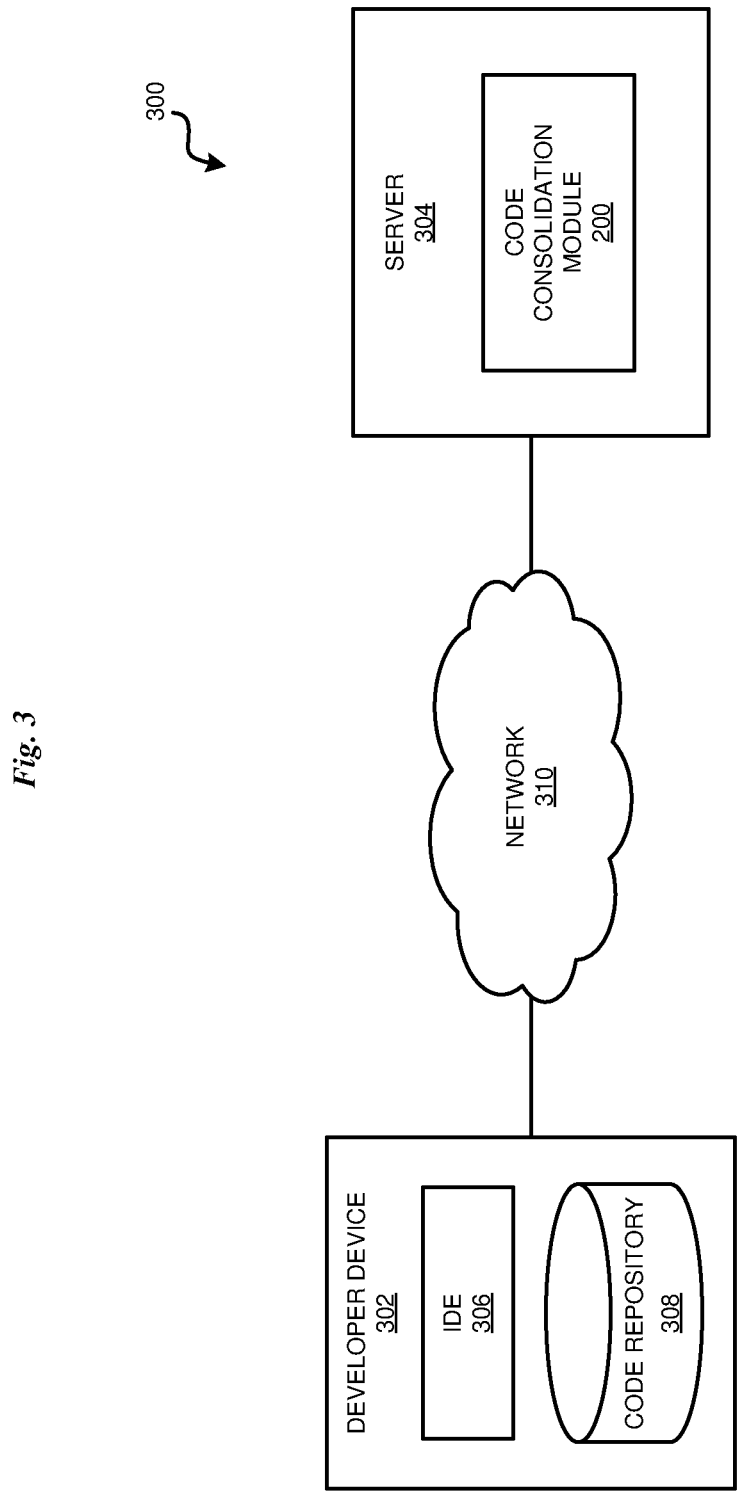
FIG. 3 depicts a block diagram of an exemplary networked computer environment that includes server having a code consolidation module in accordance with an illustrative embodiment.
Figure 4:
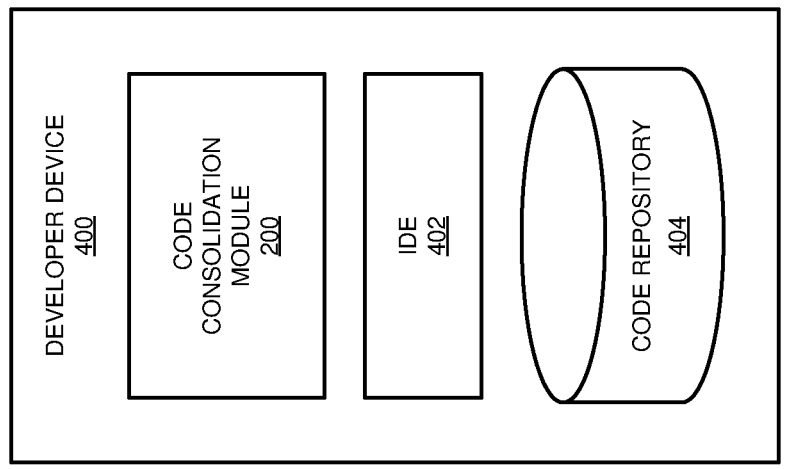
FIG. 4 depicts a block diagram of an exemplary developer device that includes a code consolidation module in accordance with an illustrative embodiment.

Embodiments of the communication network 216 include various types of communication networks, such as a wide area network (WAN), local area network (LAN), a telecommunication network, a wireless network, a public switched network and/or a satellite network. Embodiments of the communication network 216 include connections, such as wire, wireless communication links, or fiber optic cables. FIG. 2 provides only an illustration of one implementation and does not imply any limitations with regard to the environments in which different embodiments may be implemented. Many modifications to the depicted environment may be made based on design and implementation requirements. For example, FIGS. 3 and 4 show alternative exemplary implementations.

In some embodiments, developer device 202 is a computing device (e.g., laptop or a desktop) that is operated by a user to perform development tasks on a software application. In some embodiments, the developer device 202 includes a local IDE 210A and code repository 212A. In alternative embodiments, the developer device 202 allows the user to access and interact with a remote IDE 210B and code repository 212B. In still further embodiments, the developer device 202 interacts with an IDE that includes local IDE 210A components and remote IDE 210B components, and/or interacts with a code repository that includes local code repository 212A components and remote code repository 212B components. In some embodiments, the IDE 210A, 210B comprises a software suite that consolidates basic tools required to write and test software. For example, in some embodiments, the IDE 210A, 210B comprises a text editor, compiler, code libraries, and test platform. In some embodiments, the code repository 212A, 212B comprises a file archive for source code of software, documentation, web pages, and/or other application-related works, accessible either publicly or privately. In some embodiments, the code repository 212A, 212B is used by an open-source software project or multi-developer project to maintain revision and version history, or version control.

In the illustrated embodiment, the library management server 206 receives and transmits blocks of source code referred to as libraries. The library management server 206 stores the libraries in a library repository 218. The libraries may be publicly or privately available. The libraries may be accessed across a network, for example via network 216 from a user or from an IDE 210A, 210B.

In the illustrated embodiment, the code management system 208 includes a code consolidation module 200 that provides code consolidation services to the developer device s202 and development server 204. Specifically, the IDEs 210A/210B interact with the code consolidation module 200 by providing legacy source code to the code consolidation module 200. The code consolidation module 200 performs source code optimization using callable unit matching as described herein to prepare the legacy source code for modernization processes. In some embodiments, the code management system 208 includes a modernization module 214 that performs some or all of the modernization process as well.

With reference to FIG. 3, this figure depicts a block diagram of an exemplary networked computer environment 300 that includes server 304 having a code consolidation module 200 in accordance with an illustrative embodiment. FIG. 3 provides only an illustration of one implementation and does not imply any limitations with regard to the environments in which different embodiments may be implemented.

In the illustrated embodiment, the networked computer environment 300 includes developer device 302 and server 304. The developer device 302 includes an IDE 306 and a code repository 308. In some embodiments, the server 304 comprises the code consolidation module 200. In alternative embodiments, the networked computer environment 300 can include some or all of the functionality described herein but grouped differently into one or more modules. In some embodiments, the functionality described herein is distributed among a plurality of systems, which can include combinations of software and/or hardware-based systems, for example Application-Specific Integrated Circuits (ASICs), computer programs, or smart phone applications. It will be appreciated that the view of the developer device 302 and the server 304 in FIG. 3 is a simplified block diagram not intended to show every aspect of the developer device 302 and server 304; rather, in actual implementations the developer device 302 and server 304 will have many additional components not shown, such as a processor, display, system bus, etc.

Embodiments of the communication network 310 include various types of communication networks, such as a wide area network (WAN), local area network (LAN), a telecommunication network, a wireless network, a public switched network and/or a satellite network. Embodiments of the communication network 310 include connections, such as wire, wireless communication links, or fiber optic cables.

In some embodiments, developer device 302 is a computing device (e.g., laptop or a desktop) that is operated by a user to perform development tasks on a software application. In some embodiments, the developer device 302 includes a local IDE 306 and code repository 308. In some embodiments, the IDE 306 comprises a software suite that consolidates basic tools required to write and test software. For example, in some embodiments, the IDE 306 comprises a text editor, compiler, code libraries, and test platform. In some embodiments, the code repository 308 comprises a file archive for source code of software, documentation, web pages, and/or other application-related works, accessible either publicly or privately. In some embodiments, the code repository 308 is used by an open-source software project or multi-developer project to maintain revision and version history, or version control.

In the illustrated embodiment, the server 304 provides code consolidation services to the developer device 302. Specifically, the IDE 306 interacts with the code consolidation module 200 by providing legacy source code to the code consolidation module 200. The code consolidation module 200 performs source code optimization using callable unit matching as described herein to prepare the legacy source code for modernization processes. In some embodiments, the server 304 performs some or all of the modernization process as well.

With reference to FIG. 4, this figure depicts a block diagram of an exemplary developer device 400 that includes a code consolidation module 200 in accordance with an illustrative embodiment. FIG. 4 provides only an illustration of one implementation and does not imply any limitations with regard to the environments in which different embodiments may be implemented.

In the illustrated embodiment, the developer device 400 includes the code consolidation module 200 as well as an IDE 402 and a code repository 404. In alternative embodiments, the developer device 400 can include some or all of the functionality described herein but grouped differently into one or more modules. In some embodiments, the functionality described herein is distributed among a plurality of systems, which can include combinations of software and/or hardware-based systems, for example Application-Specific Integrated Circuits (ASICs), computer programs, or smart phone applications. It will be appreciated that the view of the developer device 400 in FIG. 4 is a simplified block diagram not intended to show every aspect of the developer device 400; rather, in actual implementations the developer device 400 will have many additional components not shown, such as a processor, display, system bus, etc.

In some embodiments, developer device 400 is a computing device (e.g., laptop or a desktop) that is operated by a user to perform development tasks on a software application. In some embodiments, the developer device 400 includes a local IDE 402 and code repository 404. In some embodiments, the IDE 402 comprises a software suite that consolidates basic tools required to write and test software. For example, in some embodiments, the IDE 402 comprises a text editor, compiler, code libraries, and test platform. In some embodiments, the code repository 404 comprises a file archive for source code of software, documentation, web pages, and/or other application-related works, accessible either publicly or privately. In some embodiments, the code repository 404 is used by an open-source software project or multi-developer project to maintain revision and version history, or version control.

In the illustrated embodiment, the developer device 400 also includes a code consolidation module 200 that provides code consolidation services to the IDE 402. Specifically, the IDE 402 interacts with the code consolidation module 200 by providing legacy source code to the code consolidation module 200. The code consolidation module 200 performs source code optimization using callable unit matching as described herein to prepare the legacy source code for modernization processes. In some embodiments, the developer device 400 performs some or all of the modernization process as well.

Figure 5:
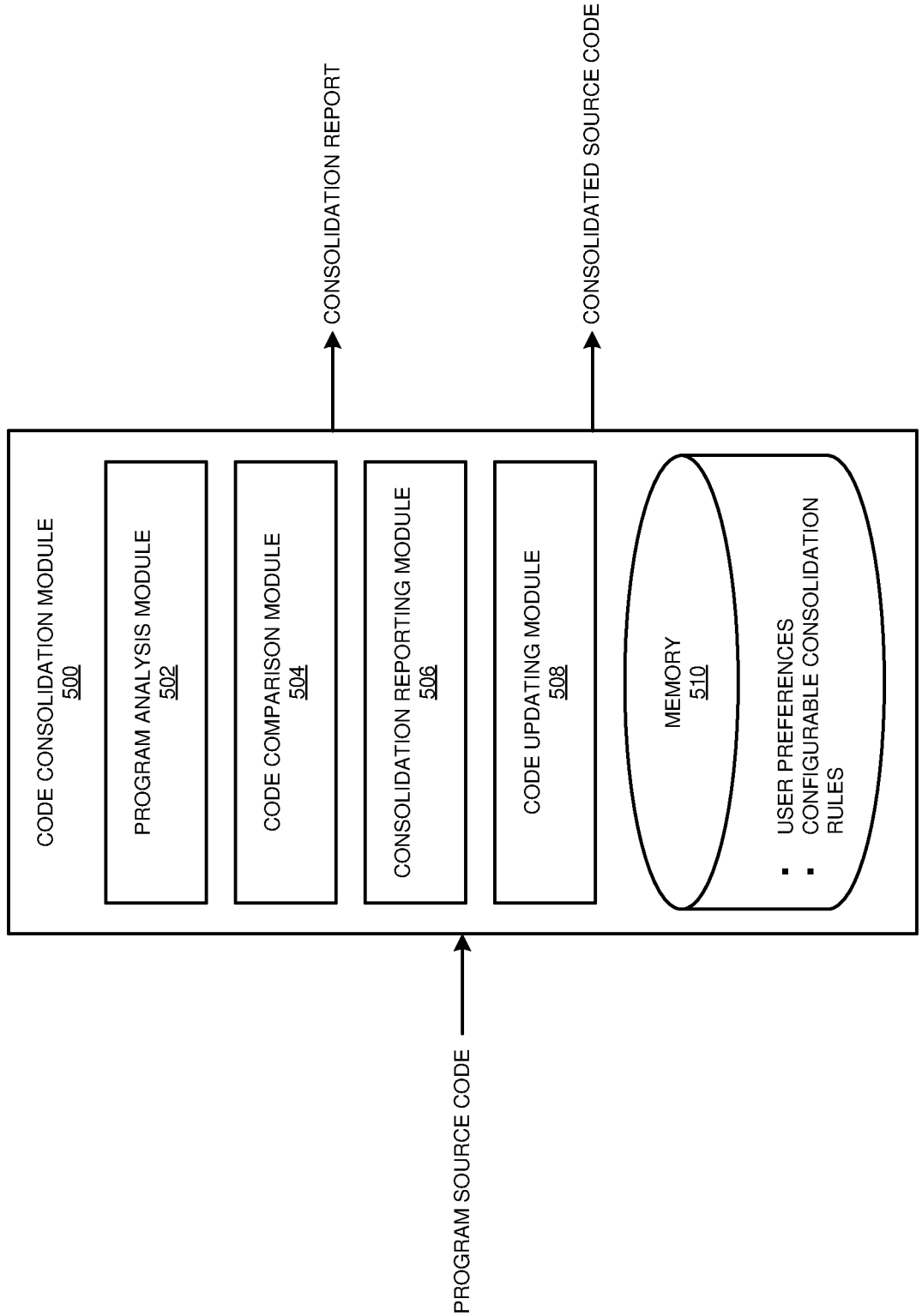
FIG. 5 depicts a block diagram of an example code consolidation module in accordance with an illustrative embodiment.

With reference to FIG. 5, this figure depicts a block diagram of an example code consolidation module 500 in accordance with an illustrative embodiment. In a particular embodiment, the code consolidation module 500 is a more detailed example of the code consolidation module 200 of FIGS. 1-4.

In the illustrated embodiment, the code consolidation module 500 includes a program analysis module 502, a code comparison module 504, a consolidation reporting module 506, a code updating module 508, and a memory 510. In alternative embodiments, the code consolidation module 500 can include some or all of the functionality described herein but grouped differently into one or more modules. In some embodiments, the functionality described herein is distributed among a plurality of systems, which can include combinations of software and/or hardware-based systems, for example Application-Specific Integrated Circuits (ASICs), computer programs, or smart phone applications.

In the illustrated embodiment, the code consolidation module 500 receives program source code for consolidation processing. For example, in some embodiments, the code consolidation module 500 receives source code for legacy software in preparation for modernizing the legacy software. The code consolidation module 500 identifies callable units that are functionally equivalent. This allows unnecessarily redundant source code to be removed, thereby reducing the amount of source code for the modernization process and improving the overall maintainability of the program.

The received source code is directed to the program analysis module 502. The program analysis module 502 executes a querying process that searches the source code in order to detect and identify all of the callable units. The program analysis module 502 then scans the contents of each of the callable units. The scanning process allows the program analysis module 502 to gather some information about each callable unit that can be used to determine if the callable unit is inherently unique or potentially duplicative.

In some embodiments, the program analysis module 502 generates unit group data indicative of a set of unit groups. Each unit group includes one or more of the callable units in the received source code. In some embodiments, the unit groups correspond with callable units that remain candidates for consolidation processing i.e., they are potentially duplicative of other callable units. In some embodiments, the scanning process detects calls to other callable units. If such a call exists, the callable unit containing the call to another callable unit is considered to be inherently unique because the call to another callable unit is treated as a unique call destination, and that callable unit is removed from consideration as a potentially redundant source code.

In some embodiments, the program analysis module 502 also detects non-local exit instructions that terminate a program during the callable unit and for instructions that control movement to another callable unit (so-called GOTO statement) while scanning the callable units. n some embodiments, such callable units are removed from consideration as a potentially redundant source code because such termination and movement control instructions complicate the reuse of the source code. In some embodiments, the callable units are kept as unit groups and thus remain consolidation candidates. In such embodiments, information regarding the termination and movement control instructions are recorded with the callable units, in case they can be matched or adequately handled later in the process.

In some embodiments, the program analysis module 502 preprocesses the callable units in the set of unit groups. In some embodiments, the code comparison module 504 performs hash-based matching. In some such embodiments, the preprocessing prepares the callable units for the hash-based matching by standardizing the callable units to the extent reasonably possible. For example, in some embodiments, the preprocessing of the callable units may be based on one or more preprocessing rules associated with standardizing the callable units. In some embodiments, the preprocessing includes eliminating spaces, newlines, comments and replacing internal variable names and internal procedural names with standardized characters. In some embodiments, the preprocessing of the callable units may be based on one or more preprocessing rules associated with the consolidation processing. In some embodiments, preprocessing may include modifying an instruction of a callable unit by at least one of casting a data type of the instruction to a different data type, removing trailing characters, removing leading characters, and replacing one or more characters in the instruction with replacement characters. For example, preprocessing may include removing and/or replacing one or more delimiters in one or more instructions.

In some embodiments, the scanning process identifies preliminary matches among the callable units. In some such embodiments, the preprocessing rule comprises changing at least one of the first and second callable units such that the first and second callable units have a same name. Also, in some such embodiments, the preprocessing rule comprises changing at least one of the first and second callable units such that a local variable in both of the first and second callable units has a same name.

Once the program analysis module 502 has completed preprocessing, the unit groups with the callable units that remain candidates for consolidation processing are provided to the code comparison module 504. In some embodiments, the code comparison module 504 performs hash-based comparison to detect matching pairs of callable units. Thus, in some embodiments, the code comparison module 504 generates hashes of each of the callable units. In some such embodiments, the code comparison module 504 then generates a data structure comprising unit identifiers associated with respective hashes and corresponding callable units in the set of unit groups. In some embodiments, the code comparison module 504 compares the hashes of the callable units in order to identify pairs of callable units having matching hashes. In some embodiments, the data structure is updated to identify the callable units having matching hashes for later confirmation of duplicative code.

In some embodiments, the consolidation reporting module 506 generates statistical data associated with a callable-unit metric for each callable unit in the set of unit groups. For example, in some embodiments, the consolidation reporting module 506 determines number of processor instructions, number of lines, and/or number of lines without comment based on such metrics. In some embodiments, this statistical data is then used as a basis for arranging and prioritizing the callable units. For example, in some embodiments the callable units having more processor instructions are assigned a higher priority than callable units having fewer processor instructions. Also, in some embodiments, the consolidation reporting module 506 discards callable units having fewer than a threshold number of processor instructions. In such embodiments, callable units having less than a threshold number of instructions are removed in order to prevent a combinatorial explosion.

In some such embodiments, the consolidation reporting module 506 then generates a report of redundant callable units based on matched-hash information in the data structure. In some embodiments, the report may be a physical report or an electronic report. In some embodiments, the report lists callable units having matching hashes to allow a user to confirm that the pair of matching callable units are duplicative. In some embodiments, the consolidation reporting module 506 generates a signal configured to cause a program update process to recognize the second callable unit as redundant to the first callable unit. In some embodiments, the consolidation reporting module 506 provides the signal to the code updating module code updating module 508. For example, in an embodiment in which first and second callable units are identified as matching callable units, the signal from consolidation reporting module 506 instructs the code updating module 508 to update the first callable unit, eliminate the second callable unit, and update calls to the second callable unit with calls to the updated first callable unit. Thus, in some embodiments, the code consolidation module 500 generates a revised program in which duplicative code has been reduced by removing the second callable unit and using the first callable unit for calls to the second callable unit.

Figure 6:
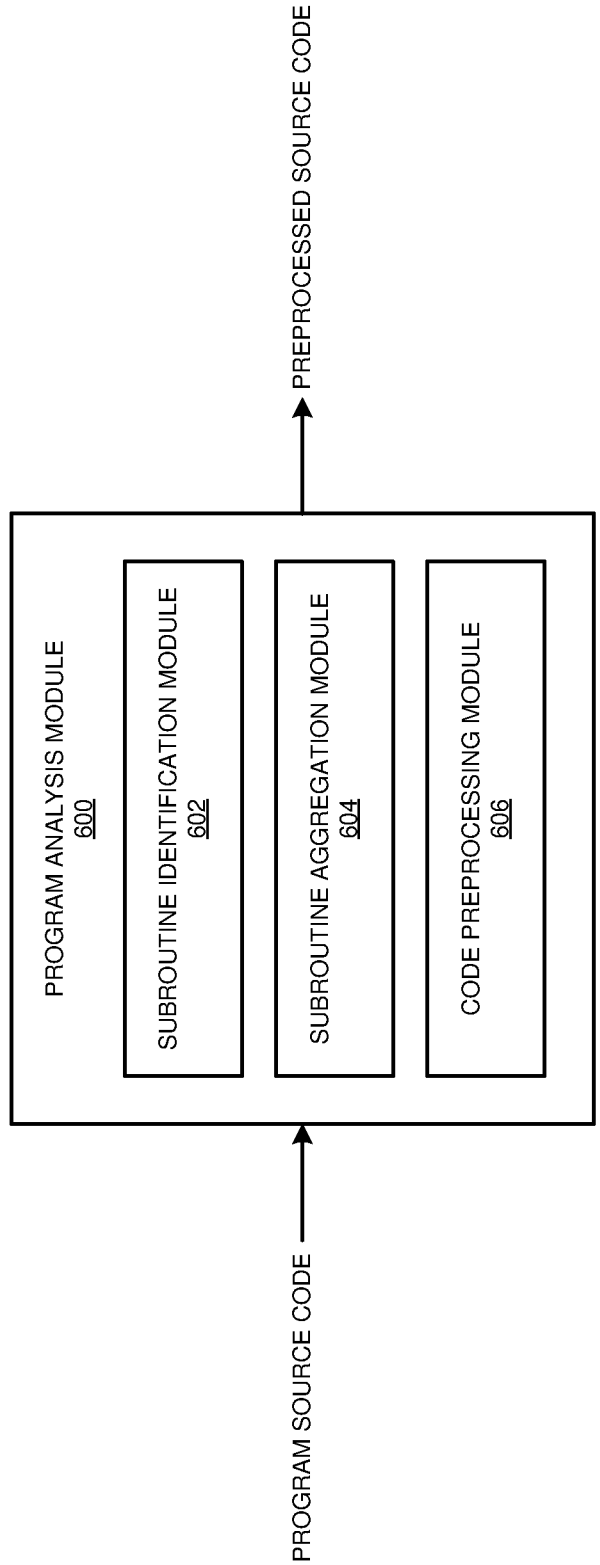
FIG. 6 depicts a block diagram of an example program analysis module in accordance with an illustrative embodiment.

With reference to FIG. 6, this figure depicts a block diagram of an example program analysis module 600 in accordance with an illustrative embodiment. In a particular embodiment, the program analysis module 600 is a more detailed example of the program analysis module 502 of FIG. 5.

In the illustrated embodiment, the program analysis module 600 includes a subroutine identification module 602, a subroutine aggregation module 604, and a code preprocessing module 606. In alternative embodiments, the program analysis module 600 can include some or all of the functionality described herein but grouped differently into one or more modules. In some embodiments, the functionality described herein is distributed among a plurality of systems, which can include combinations of software and/or hardware-based systems, for example Application-Specific Integrated Circuits (ASICs), computer programs, or smart phone applications.

In the illustrated embodiment, the subroutine identification module 602 receives program source code for consolidation processing. The subroutine identification module 602 executes a querying process that searches the source code in order to detect and identify all of the callable units. The subroutine identification module 602 then scans the contents of each of the callable units. The scanning process allows the subroutine identification module 602 to gather some information about each callable unit that can be used to determine if the callable unit is inherently unique or potentially duplicative.

Figure 7:
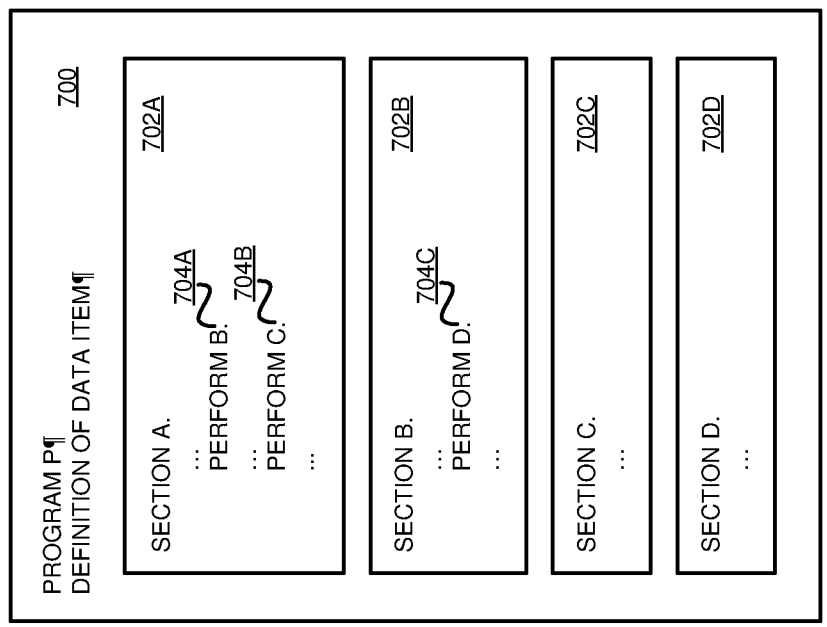
FIG. 7 depicts a block diagram of a program architecture in accordance with an illustrative embodiment.

Reference is now also made to FIG. 7, which depicts a block diagram of a program architecture 700 in accordance with an illustrative embodiment. In a particular embodiment, the program architecture 700 is an example of a legacy program processed by the program analysis module 600 of FIG. 6.

The program architecture 700 is provided as a non-limiting example for purposes of providing additional clarity. In the illustrated embodiment, the program architecture 700 includes four callable units 702A-702D. The callable unit 702A includes call instruction 704A, which is a call to callable unit 702B. The callable unit 702A also includes call instruction 704B, which is a call to callable unit 702C. The callable unit 702B includes call instruction 704C, which is a call to callable unit 702D. Thus, the callable units 702A-702D are divided into four groups including (A, B, C, D), (B, D), (C), and (D). Note that independent A and B may have different subroutine call destinations and are therefore not included in targets for sharable codes. More specifically, since the callable unit 702A calls all of callable units 702B, 702C, and 702D, (A, B, C, D) is a subroutine group but callable unit 702A itself is not a group. Note that such a group corresponds to the program P. There is always at least one subroutine group corresponding to the entire program as such (except for the case of unused code). Since the callable unit 702B calls callable unit 702D, (B, D) is a subroutine group but (B) itself is not a group. Since the subroutines 702C and 702D do not call other internal subroutines, (C) and (D) are subroutine groups. From the above, there are four subroutine groups as follows that exists in the program P and are targets for comparison of similarity: (A, B, C, D), (B, D), (C), and (D).

Thus, in order to account for differences in subroutine call destinations and the subroutine statement sequences, the relationships of the callable units are analyzed to group callable units with other callable units that they call or that call them.

In some embodiments, the subroutine aggregation module 604 aggregates the callable units 702A-702D into a set of unit groups. In some embodiments, each unit group includes one or more of the callable units in the received source code. In some embodiments, the unit groups correspond with callable units that remain candidates for consolidation processing i.e., they are potentially duplicative of other callable units. In some embodiments, the scanning process detects calls to other callable units. If such a call exists, the callable unit containing the call to another callable unit is considered to be inherently unique because the call to another callable unit is treated as a unique call destination, and that callable unit is removed from consideration as a potentially redundant source code. However, that callable unit remains in a unit group with the callable units it calls.

In some embodiments, the subroutine aggregation module 604 also detects non-local exit instructions that terminate a program during the callable unit and for instructions that control movement to another callable unit (so-called GOTO statement) while scanning the callable units. n some embodiments, such callable units are removed from consideration as a potentially redundant source code because such termination and movement control instructions complicate the reuse of the source code. In some embodiments, the callable units are kept as unit groups and thus remain consolidation candidates. In such embodiments, information regarding the termination and movement control instructions are recorded with the callable units, in case they can be matched or adequately handled later in the process.

In some embodiments, the code preprocessing module 606 preprocesses the callable units in the set of unit groups. In some embodiments, the code preprocessing module 606 prepares the callable units for the hash-based matching by standardizing the callable units to the extent reasonably possible.

Figure 8:
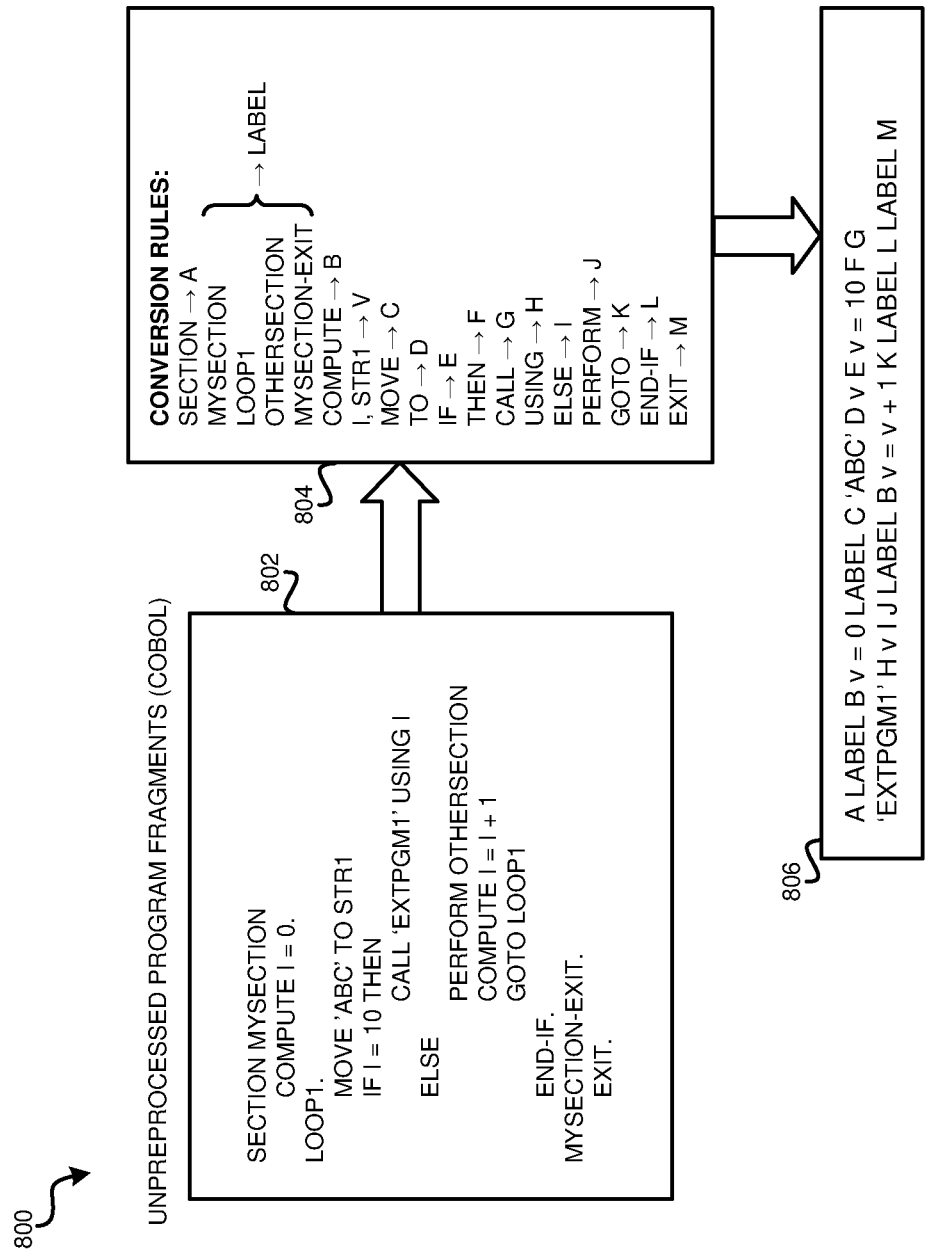
FIG. 8 depicts a preprocessing diagram in accordance with an illustrative embodiment.

Reference is now also made to FIG. 8, which depicts a preprocessing diagram 800 in accordance with an illustrative embodiment. In a particular embodiment, the preprocessing diagram 800 is performed by the code preprocessing module 606 of FIG. 6.

The preprocessing diagram 800 includes an initial callable unit original source code 802 that has not yet been preprocesses. The preprocessing diagram 800 is provided as a non-limiting example for purposes of providing additional clarity. As shown in FIG. 8, the preprocessing is performed using the preprocessing rules 804. Each of the preprocessing rules 804 is applied to the source code of the original source code 802. The result is preprocessed code 806.

In some embodiments, the preprocessing of the callable units may be based on one or more preprocessing rules associated with standardizing the callable units. In some embodiments, the preprocessing includes eliminating spaces, newlines, comments and replacing internal variable names and internal procedural names with standardized characters. In some embodiments, the preprocessing of the callable units may be based on one or more preprocessing rules associated with the consolidation processing. In some embodiments, preprocessing may include modifying an instruction of a callable unit by at least one of casting a data type of the instruction to a different data type, removing trailing characters, removing leading characters, and replacing one or more characters in the instruction with replacement characters. For example, preprocessing may include removing and/or replacing one or more delimiters in one or more instructions.

In some embodiments, the scanning process identifies preliminary matches among the callable units. In some such embodiments, the preprocessing rule comprises changing at least one of the first and second callable units such that the first and second callable units have a same name. Also, in some such embodiments, the preprocessing rule comprises changing at least one of the first and second callable units such that a local variable in both of the first and second callable units has a same name.

Figure 9:
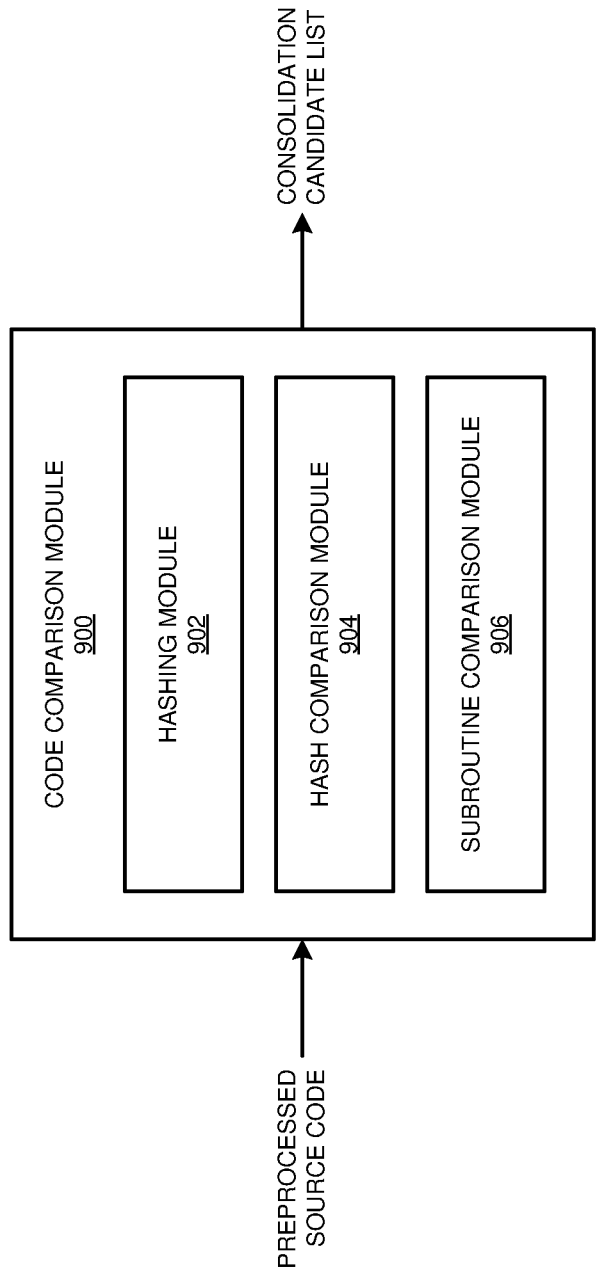
FIG. 9 depicts a block diagram of an example code comparison module in accordance with an illustrative embodiment.

With reference to FIG. 9, this figure depicts a block diagram of an example code comparison module 900 in accordance with an illustrative embodiment. In a particular embodiment, the code comparison module 900 is a more detailed example of the code comparison module 504 of FIG. 5.

In the illustrated embodiment, the code comparison module 900 includes a hashing module 902, a hash comparison module 904, and a subroutine comparison module 906. In alternative embodiments, the code comparison module 900 can include some or all of the functionality described herein but grouped differently into one or more modules. In some embodiments, the functionality described herein is distributed among a plurality of systems, which can include combinations of software and/or hardware-based systems, for example Application-Specific Integrated Circuits (ASICs), computer programs, or smart phone applications.

In the illustrated embodiment, the hashing module 902 receives preprocessed source code from the program analysis module 600. Once the program analysis module 600 has completed preprocessing, the unit groups with the callable units that remain candidates for consolidation processing are provided to the hashing module 902 of the code comparison module 900. In some embodiments, the code comparison module 900 performs hash-based comparison to detect matching pairs of callable units. Thus, in some embodiments, the hashing module 902 generates hashes of each of the callable units. In some such embodiments, the hash comparison module 904 then generates a data structure comprising unit identifiers associated with respective hashes and corresponding callable units in the set of unit groups. In some embodiments, the hash comparison module 904 compares the hashes of the callable units in order to identify pairs of callable units having matching hashes.

In some embodiments, the subroutine comparison module 906 updates the data structure is updated to identify the callable units having matching hashes for later confirmation of duplicative code. Alternatively, in some embodiments, a second matching technique can be applied by the subroutine comparison module 906 to verify whether each pair of callable units having matching hashes are matching callable units. The result is a consolidation candidate list that is provided to the consolidation reporting module 1000 of FIG. 10.

Figure 10:
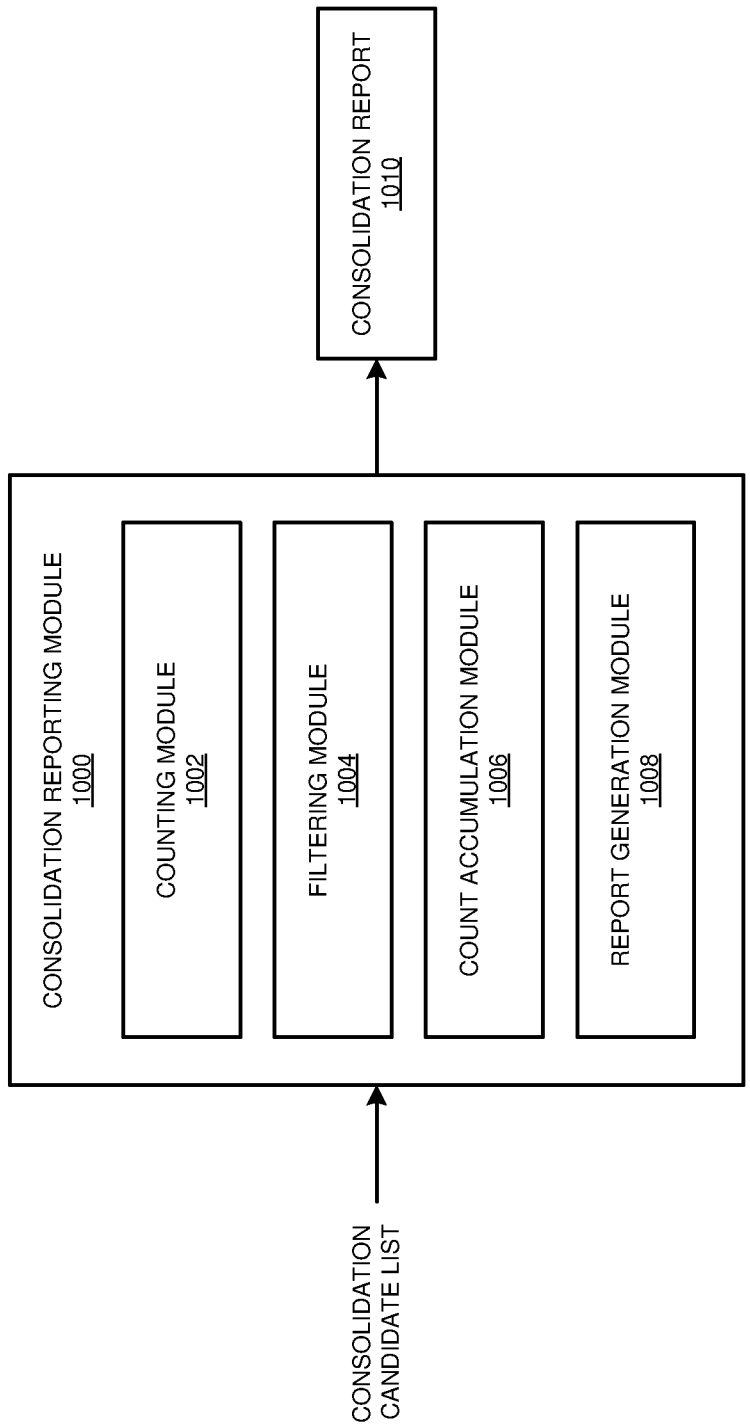
FIG. 10 depicts a block diagram of an example consolidation reporting module in accordance with an illustrative embodiment.

With reference to FIG. 10, this figure depicts a block diagram of an example consolidation reporting module 1000 in accordance with an illustrative embodiment. In a particular embodiment, the consolidation reporting module 1000 is a more detailed example of the consolidation reporting module 506 of FIG. 5.

In the illustrated embodiment, the consolidation reporting module 1000 includes a counting module 1002, a filtering module 1004, a count accumulation module 1006, and a report generation module 1008. In alternative embodiments, the consolidation reporting module 1000 can include some or all of the functionality described herein but grouped differently into one or more modules. In some embodiments, the functionality described herein is distributed among a plurality of systems, which can include combinations of software and/or hardware-based systems, for example Application-Specific Integrated Circuits (ASICs), computer programs, or smart phone applications.

In the illustrated embodiment, the counting module 1002 receives the consolidation candidate list. In some embodiments, the counting module 1002 generates statistical data associated with a callable-unit metric for each callable unit in the set of unit groups. For example, in some embodiments, the counting module 1002 determines number of processor instructions, number of lines, and/or number of lines without comment based on such metrics. In some embodiments, this statistical data is then used as a basis for arranging and prioritizing the callable units. For example, in some embodiments the callable units having more processor instructions are assigned a higher priority than callable units having fewer processor instructions.

In some embodiments, filtering module 1004 discards callable units having fewer than a threshold number of processor instructions. In such embodiments, callable units having less than a threshold number of instructions are removed in order to prevent a combinatorial explosion.

In some embodiments, the count accumulation module 1006 generates overall statistical data indicative of one or more aspects of the consolidation processing. For example, in some embodiments, the count accumulation module 1006 determines an overall number of processor instructions, overall number of lines, and/or overall number of lines without comment based on a sum of all of the individual values. In some embodiments, this statistical data is then used as a basis for report data that is indicative of the number of duplicative processor instructions or lines of code that have been eliminated overall.

In some such embodiments, the report generation module 1008 then generates a consolidation report 1010 of redundant callable units based on matched-hash information in the data structure. In some embodiments, the report may be a physical report or an electronic report. In some embodiments, the consolidation report 1010 lists callable units having matching hashes to allow a user to confirm that the pair of matching callable units are duplicative.

Figure 11:
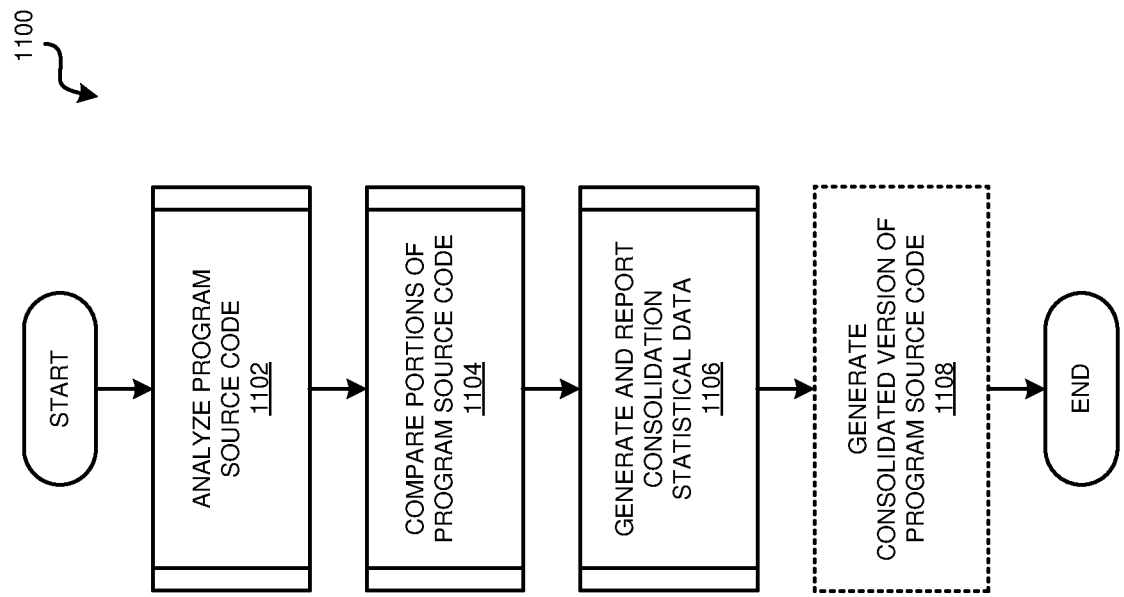
FIG. 11 depicts a flowchart of an example process for optimizing source code using callable unit matching in accordance with an illustrative embodiment.

With reference to FIG. 11, this figure depicts a flowchart of an example process 1100 for optimizing source code using callable unit matching in accordance with an illustrative embodiment. In a particular embodiment, the code consolidation module 200 of FIGS. 1-4 or the code consolidation module 500 of FIG. 5 carries out the process 1100.

In the illustrated embodiment, the process 1100 receives program source code for consolidation processing. For example, in some embodiments, the process 1100 receives source code for legacy software in preparation for modernizing the legacy software. The process 1100 identifies callable units that are functionally equivalent. This allows unnecessarily redundant source code to be removed, thereby reducing the amount of source code for the modernization process and improving the overall maintainability of the program.

In the illustrated embodiment, at block 1102, the process executes a querying process that searches the source code in order to detect and identify all of the callable units. The process 1100 then scans the contents of each of the callable units. The scanning process allows the process 1100 to gather some information about each callable unit that can be used to determine if the callable unit is inherently unique or potentially duplicative.

In some embodiments, the process 1100 generates unit group data indicative of a set of unit groups. Each unit group includes one or more of the callable units in the received source code. In some embodiments, the unit groups correspond with callable units that remain candidates for consolidation processing i.e., they are potentially duplicative of other callable units. In some embodiments, the scanning process detects calls to other callable units. If such a call exists, the callable unit containing the call to another callable unit is considered to be inherently unique because the call to another callable unit is treated as a unique call destination, and that callable unit is removed from consideration as a potentially redundant source code.

In some embodiments, the process 1100 also detects non-local exit instructions that terminate a program during the callable unit and for instructions that control movement to another callable unit (so-called GOTO statement) while scanning the callable units. In some embodiments, such callable units are removed from consideration as a potentially redundant source code because such termination and movement control instructions complicate the reuse of the source code. In some embodiments, the callable units are kept as unit groups and thus remain consolidation candidates. In such embodiments, information regarding the termination and movement control instructions are recorded with the callable units, in case they can be matched or adequately handled later in the process.

In some embodiments, the process 1100 preprocesses the callable units in the set of unit groups. In some embodiments, the process 1100 performs hash-based matching. In some such embodiments, the preprocessing prepares the callable units for the hash-based matching by standardizing the callable units to the extent reasonably possible. For example, in some embodiments, the preprocessing of the callable units may be based on one or more preprocessing rules associated with standardizing the callable units. In some embodiments, the preprocessing includes eliminating spaces, newlines, comments and replacing internal variable names and internal procedural names with standardized characters. In some embodiments, the preprocessing of the callable units may be based on one or more preprocessing rules associated with the consolidation processing. In some embodiments, preprocessing may include modifying an instruction of a callable unit by at least one of casting a data type of the instruction to a different data type, removing trailing characters, removing leading characters, and replacing one or more characters in the instruction with replacement characters. For example, preprocessing may include removing and/or replacing one or more delimiters in one or more instructions.

In some embodiments, the scanning process identifies preliminary matches among the callable units. In some such embodiments, the preprocessing rule comprises changing at least one of the first and second callable units such that the first and second callable units have a same name. Also, in some such embodiments, the preprocessing rule comprises changing at least one of the first and second callable units such that a local variable in both of the first and second callable units has a same name.

Next, at block 1104, once the process 1100 has completed preprocessing, the unit groups with the callable units that remain candidates for consolidation processing are processed at block 1104. In some embodiments, the process 1100 performs hash-based comparison to detect matching pairs of callable units. Thus, in some embodiments, the process 1100 generates hashes of each of the callable units. In some such embodiments, the process 1100 then generates a data structure comprising unit identifiers associated with respective hashes and corresponding callable units in the set of unit groups. In some embodiments, the process 1100 compares the hashes of the callable units in order to identify pairs of callable units having matching hashes. In some embodiments, the data structure is updated to identify the callable units having matching hashes for later confirmation of duplicative code.

Next, at block 1106, the process 1100 generates statistical data associated with a callable-unit metric for each callable unit in the set of unit groups. For example, in some embodiments, the process 1100 determines number of processor instructions, number of lines, and/or number of lines without comment based on such metrics. In some embodiments, this statistical data is then used as a basis for arranging and prioritizing the callable units. For example, in some embodiments the callable units having more processor instructions are assigned a higher priority than callable units having fewer processor instructions. Also, in some embodiments, the process 1100 discards callable units having fewer than a threshold number of processor instructions. In such embodiments, callable units having less than a threshold number of instructions are removed in order to prevent a combinatorial explosion.

In some such embodiments, the process 1100 then generates a report of redundant callable units based on matched-hash information in the data structure. In some embodiments, the report may be a physical report or an electronic report. In some embodiments, the report lists callable units having matching hashes to allow a user to confirm that the pair of matching callable units are duplicative.

Next, at optional block 1108, in some embodiments, the process 1100 generates a signal configured to cause a program update process to recognize the second callable unit as redundant to the first callable unit. In some embodiments, the process 1100 provides the signal to a code updating module or the like. For example, in an embodiment in which first and second callable units are identified as matching callable units, the signal from process 1100 instructs the code updating module to update the first callable unit, eliminate the second callable unit, and update calls to the second callable unit with calls to the updated first callable unit. Thus, in some embodiments, the 1100 causes generation of a revised program in which duplicative code has been reduced by removing the second callable unit and using the first callable unit for calls to the second callable unit.

Figure 12:
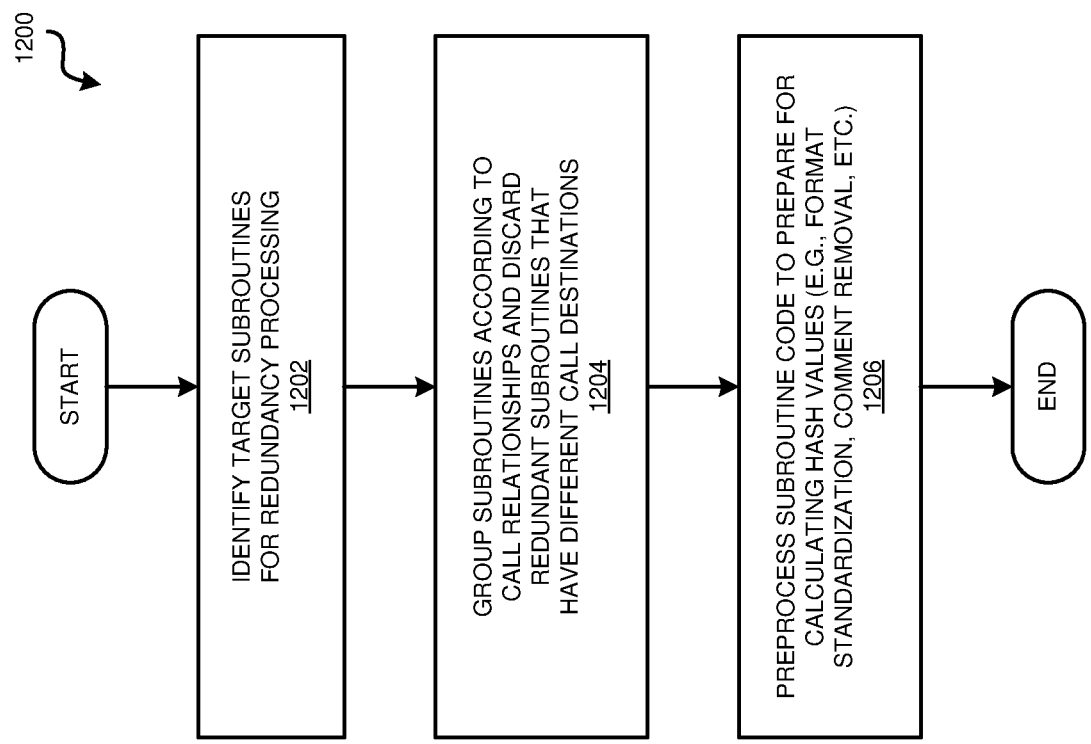
FIG. 12 depicts a flowchart of an example process for analyzing program source code in accordance with an illustrative embodiment.

With reference to FIG. 12, this figure depicts a flowchart of an example process 1200 for analyzing program source code in accordance with an illustrative embodiment. In a particular embodiment, the process 1200 is an example of the block 1102 of FIG. 11.

In an embodiment, at block 1202, the process executes a querying process that searches the source code in order to detect and identify all of the callable units. The process 1200 then scans the contents of each of the callable units. The scanning process allows the process 1200 to gather some information about each callable unit that can be used to determine if the callable unit is inherently unique or potentially duplicative.

Next, at block 1204, in some embodiments, the process 1200 generates unit group data indicative of a set of unit groups. Each unit group includes one or more of the callable units in the received source code. In some embodiments, the unit groups correspond with callable units that remain candidates for consolidation processing i.e., they are potentially duplicative of other callable units. In some embodiments, the scanning process detects calls to other callable units. If such a call exists, the callable unit containing the call to another callable unit is considered to be inherently unique because the call to another callable unit is treated as a unique call destination, and that callable unit is removed from consideration as a potentially redundant source code.

In some embodiments, the process 1200 also detects non-local exit instructions that terminate a program during the callable unit and for instructions that control movement to another callable unit (so-called GOTO statement) while scanning the callable units. In some embodiments, such callable units are removed from consideration as a potentially redundant source code because such termination and movement control instructions complicate the reuse of the source code. In some embodiments, the callable units are kept as unit groups and thus remain consolidation candidates. In such embodiments, information regarding the termination and movement control instructions are recorded with the callable units, in case they can be matched or adequately handled later in the process.

Next, at block 1206, in some embodiments, the process 1200 preprocesses the callable units in the set of unit groups. In some embodiments, the process 1200 performs hash-based matching. In some such embodiments, the preprocessing prepares the callable units for the hash-based matching by standardizing the callable units to the extent reasonably possible. For example, in some embodiments, the preprocessing of the callable units may be based on one or more preprocessing rules associated with standardizing the callable units. In some embodiments, the preprocessing includes eliminating spaces, newlines, comments and replacing internal variable names and internal procedural names with standardized characters. In some embodiments, the preprocessing of the callable units may be based on one or more preprocessing rules associated with the consolidation processing. In some embodiments, preprocessing may include modifying an instruction of a callable unit by at least one of casting a data type of the instruction to a different data type, removing trailing characters, removing leading characters, and replacing one or more characters in the instruction with replacement characters. For example, preprocessing may include removing and/or replacing one or more delimiters in one or more instructions.

In some embodiments, the scanning process identifies preliminary matches among the callable units. In some such embodiments, the preprocessing rule comprises changing at least one of the first and second callable units such that the first and second callable units have a same name. Also, in some such embodiments, the preprocessing rule comprises changing at least one of the first and second callable units such that a local variable in both of the first and second callable units has a same name.

Figure 13:
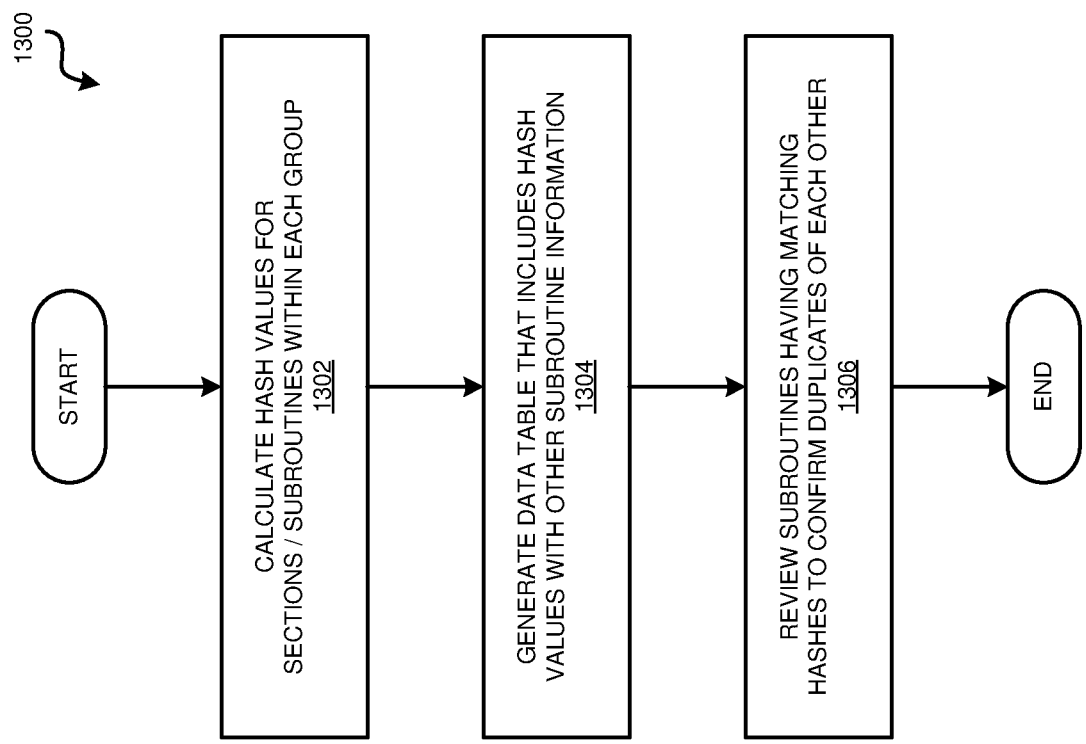
FIG. 13 depicts a flowchart of an example process for comparing portions of program source code in accordance with an illustrative embodiment.

With reference to FIG. 13, this figure depicts a flowchart of an example process 1300 for comparing portions of program source code in accordance with an illustrative embodiment. In a particular embodiment, the process 1300 is an example of the block 1104 of FIG. 11.

In an embodiment, at block 1302, the process 1300 generates hashes of each of the callable units. Next, at block 1304, in some such embodiments, the process 1300 then generates a data structure comprising unit identifiers associated with respective hashes and corresponding callable units in the set of unit groups. Next, at block 1306, in some embodiments, the process 1300 compares the hashes of the callable units in order to identify pairs of callable units having matching hashes. In some embodiments, the data structure is updated to identify the callable units having matching hashes for later confirmation of duplicative code.

Figure 14:
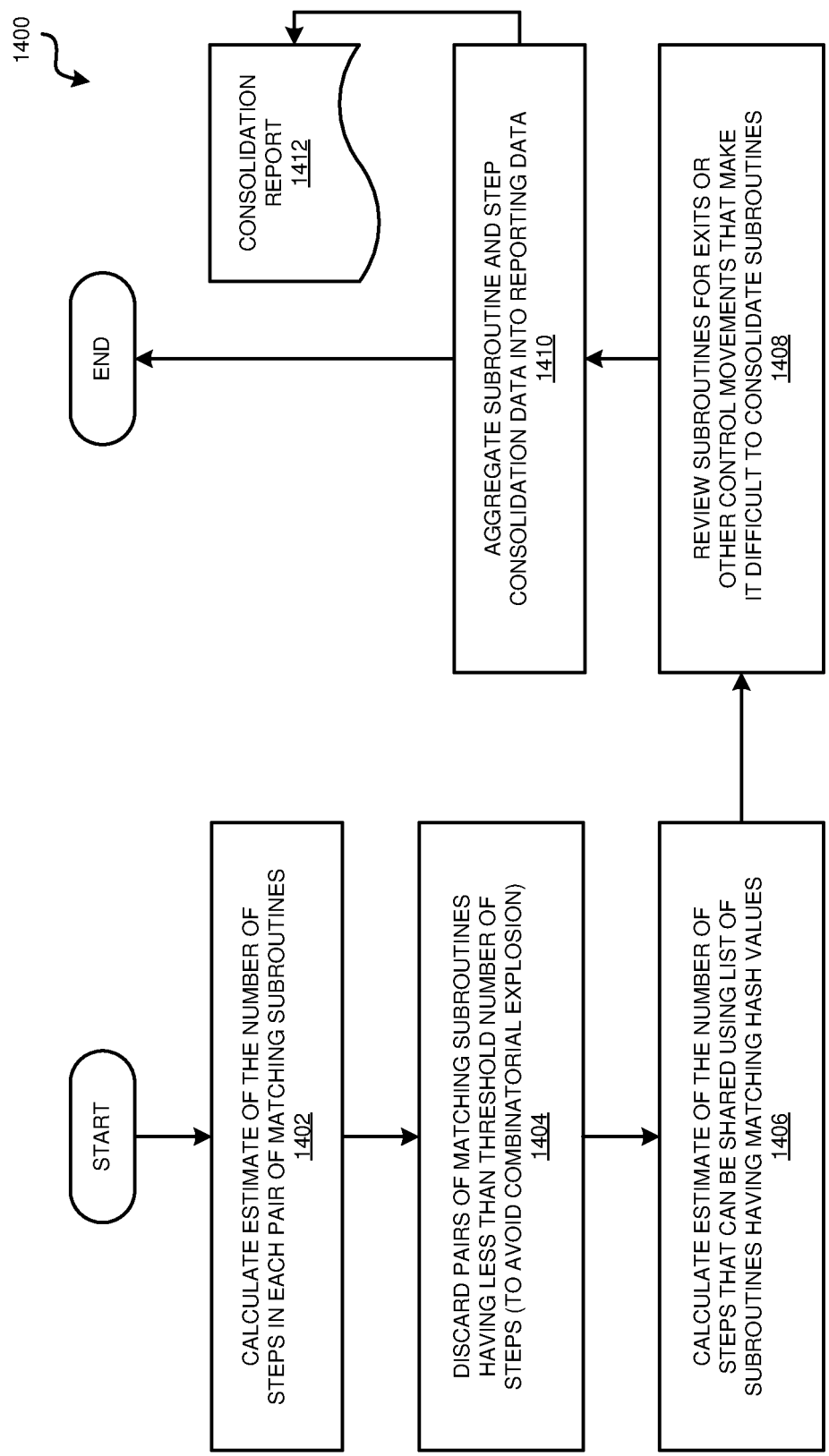
FIG. 14 depicts a flowchart of an example process for generating and reporting consolidation statistical data in accordance with an illustrative embodiment.

With reference to FIG. 14, this figure depicts a flowchart of an example process 1400 for generating and reporting consolidation statistical data in accordance with an illustrative embodiment. In a particular embodiment, the process 1400 is an example of the block 1106 of FIG. 11.

In an embodiment, at block 1402, generates statistical data associated with a callable-unit metric for each callable unit in the set of unit groups. For example, in some embodiments, the process 1400 determines number of processor instructions, number of lines, and/or number of lines without comment based on such metrics. In some embodiments, this statistical data is then used as a basis for arranging and prioritizing the callable units. For example, in some embodiments the callable units having more processor instructions are assigned a higher priority than callable units having fewer processor instructions.

Next, at block 1404, in some embodiments, the process 1400 discards callable units having fewer than a threshold number of processor instructions. In such embodiments, callable units having less than a threshold number of instructions are removed in order to prevent a combinatorial explosion.

Next, at block 1406, in some embodiments, the process 1400 generates overall statistical data indicative of one or more aspects of the consolidation processing. For example, in some embodiments, the process 1400 determines an overall number of processor instructions, overall number of lines, and/or overall number of lines without comment based on a sum of all of the individual values. In some embodiments, this statistical data is then used as a basis for report data that is indicative of the number of duplicative processor instructions or lines of code that have been eliminated overall.

Next, at block 1408, if not already completed, then at this point the process 1400 detects non-local exit instructions that terminate a program during the callable unit and for instructions that control movement to another callable unit (so-called GOTO statement) while scanning the callable units. In some embodiments, such callable units are removed from consideration as a potentially redundant source code because such termination and movement control instructions complicate the reuse of the source code. In some embodiments, the callable units are kept as unit groups and thus remain consolidation candidates. In such embodiments, information regarding the termination and movement control instructions are recorded with the callable units, in case they can be matched or adequately handled later in the process.

Next, at block 1410, in some such embodiments, the process 1400 then generates a report 1412 of redundant callable units based on matched-hash information in the data structure. In some embodiments, the report may be a physical report or an electronic report. In some embodiments, the report lists callable units having matching hashes to allow a user to confirm that the pair of matching callable units are duplicative.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Thus, a computer implemented method, system or apparatus, and computer program product are provided in the illustrative embodiments for managing participation in online communities and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems. Although the above embodiments of present invention each have been described by stating their individual advantages, respectively, present invention is not limited to a particular combination thereof. To the contrary, such embodiments may also be combined in any way and number according to the intended deployment of present invention without losing their beneficial effects.

What is claimed is:

1. A computer-implemented method comprising:
    executing a querying process that searches source code of a program for callable units within the source code of the program;
    scanning contents of callable units in a set of callable units returned by the querying process;
    generating unit group data indicative of a set of unit groups, wherein the set of unit groups comprises groups of one or more callable units of the set of callable units;
    preprocessing callable units in the set of unit groups, wherein the preprocessing comprises revising the callable units based on a preprocessing rule;
    generating hashes of each of the callable units in the set of unit groups, wherein the callable units in the set of unit groups comprise a first callable unit and a second callable unit, and wherein the hashes comprise a first hash of the first callable unit and a second hash of the second callable unit;
    generating a data structure comprising unit identifiers associated with respective hashes and corresponding callable units in the set of unit groups;
    generating statistical data associated with a callable-unit metric for each callable unit in the set of unit groups;
    updating the data structure by associating priority values with respective callable units, wherein the priority values prioritize the callable units based on the statistical data;
    comparing hashes of the callable units in the set of unit groups, the comparing comprising identifying pairs of redundancy candidates from among the callable units in the unit groups, wherein the comparing comprises detecting that the first hash matches the second hash;
    updating the data structure by identifying the second callable unit as being redundant to the first callable unit; and
    generating a report of redundant callable units based on the data structure.

2. The method of claim 1, wherein the scanning comprises identifying calls to callable units in the set of callable units from other callable units in the set of callable units.

3. The method of claim 2, wherein the generating of the unit group data comprises grouping callable units called by other callable units while excluding callable units that call other callable units.

4. The method of claim 1, wherein the preprocessing rule comprises changing at least one of the first and second callable units such that the first and second callable units have a same name.

5. The method of claim 1, wherein the preprocessing rule comprises changing at least one of the first and second callable units such that a local variable in both of the first and second callable units has a same name.

6. The method of claim 1, wherein the statistical data is indicative of a number of processor instructions.

7. The method of claim 6, wherein callable units having more processor instructions are assigned a higher priority than callable units having fewer processor instructions.

8. The method of claim 1, further comprising:
    removing, from the set of unit groups, callable units having fewer than a threshold number of processor instructions.

9. The method of claim 1, further comprising:
    removing, from the set of unit groups, callable units having a non-local exit instruction.

10. The method of claim 1, further comprising:
    generating a signal configured to cause a program update process to recognize the second callable unit as redundant to the first callable unit.

11. The method of claim 10, wherein the signal instructs the program update process to update the first callable unit, eliminates the second callable unit, and update calls to the second callable unit with calls to the updated first callable unit.

12. The method of claim 1, further comprising:
    generating a revised program from the program, the generating comprising removing the second callable unit and using the first callable unit for calls to the second callable unit.

13. A computer program product comprising one or more computer readable storage media, and program instructions collectively stored on the one or more computer readable storage media, the program instructions executable by a processor to cause the processor to perform operations comprising:
    executing a querying process that searches source code of a program for callable units within the source code of the program;
    scanning contents of callable units in a set of callable units returned by the querying process;

generating unit group data indicative of a set of unit groups, wherein the set of unit groups comprises groups of one or more callable units of the set of callable units;

preprocessing callable units in the set of unit groups, wherein the preprocessing comprises revising the callable units based on a preprocessing rule;

generating hashes of each of the callable units in the set of unit groups, wherein the callable units in the set of unit groups comprise a first callable unit and a second callable unit, and wherein the hashes comprise a first hash of the first callable unit and a second hash of the second callable unit;

generating a data structure comprising unit identifiers associated with respective hashes and corresponding callable units in the set of unit groups;

generating statistical data associated with a callable-unit metric for each callable unit in the set of unit groups;

updating the data structure by associating priority values with respective callable units, wherein the priority values prioritize the callable units based on the statistical data;

comparing hashes of the callable units in the set of unit groups, the comparing comprising identifying pairs of redundancy candidates from among the callable units in the unit groups, wherein the comparing comprises detecting that the first hash matches the second hash;

updating the data structure by identifying the second callable unit as being redundant to the first callable unit; and generating a report of redundant callable units based on the data structure.

14. The computer program product of claim 13, wherein the stored program instructions are stored in a computer readable storage device in a data processing system, and wherein the stored program instructions are transferred over a network from a remote data processing system.

15. The computer program product of claim 13, wherein the stored program instructions are stored in a computer readable storage device in a server data processing system, and wherein the stored program instructions are downloaded in response to a request over a network to a remote data processing system for use in a computer readable storage device associated with the remote data processing system, further comprising:
   program instructions to meter use of the program instructions associated with the request; and
   program instructions to generate an invoice based on the metered use.

16. The computer program product of claim 13, wherein the scanning comprises identifying calls to callable units in the set of callable units from other callable units in the set of callable units.

17. The computer program product of claim 16, wherein the generating of the unit group data comprises grouping callable units called by other callable units while excluding callable units that call other callable units.

18. A computer system comprising a processor and one or more computer readable storage media, and program instructions collectively stored on the one or more computer readable storage media, the program instructions executable by the processor to cause the processor to perform operations comprising:
   executing a querying process that searches source code of a program for callable units within the source code of the program;
   scanning contents of callable units in a set of callable units returned by the querying process;
   generating unit group data indicative of a set of unit groups, wherein the set of unit groups comprises groups of one or more callable units of the set of callable units;
   preprocessing callable units in the set of unit groups, wherein the preprocessing comprises revising the callable units based on a preprocessing rule;
   generating hashes of each of the callable units in the set of unit groups, wherein the callable units in the set of unit groups comprise a first callable unit and a second callable unit, and wherein the hashes comprise a first hash of the first callable unit and a second hash of the second callable unit;
   generating a data structure comprising unit identifiers associated with respective hashes and corresponding callable units in the set of unit groups;
   generating statistical data associated with a callable-unit metric for each callable unit in the set of unit groups;
   updating the data structure by associating priority values with respective callable units, wherein the priority values prioritize the callable units based on the statistical data;
   comparing hashes of the callable units in the set of unit groups, the comparing comprising identifying pairs of redundancy candidates from among the callable units in the unit groups, wherein the comparing comprises detecting that the first hash matches the second hash;
   updating the data structure by identifying the second callable unit as being redundant to the first callable unit; and
   generating a report of redundant callable units based on the data structure.

19. The computer system of claim 18, wherein the scanning comprises identifying calls to callable units in the set of callable units from other callable units in the set of callable units.

20. The computer system of claim 19, wherein the generating of the unit group data comprises grouping callable units called by other callable units while excluding callable units that call other callable units.

* * * * *